(12) United States Patent
Surna et al.

(10) Patent No.: US 8,086,593 B2
(45) Date of Patent: Dec. 27, 2011

(54) DYNAMIC FILTERS FOR RELATIONAL QUERY PROCESSING

(75) Inventors: Aleksandras Surna, Redmond, WA (US); Sreenivas Gukal, Sammamish, WA (US); Peter Zabback, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 11/680,708

(22) Filed: Mar. 1, 2007

(65) Prior Publication Data

US 2008/0215556 A1 Sep. 4, 2008

(51) Int. Cl.
*G06F 7/00* (2006.01)

(52) U.S. Cl. ................. 707/713; 707/E17.017

(58) Field of Classification Search ...... 707/4, 687–704, 707/604–606, 736, 75, 713, E17.017
See application file for complete search history.

(56) References Cited

U.S. PATENT DOCUMENTS

| 5,249,262 | A | | 9/1993 | Baule | |
|---|---|---|---|---|---|
| 5,412,804 | A | * | 5/1995 | Krishna | 707/2 |
| 5,592,668 | A | * | 1/1997 | Harding et al. | 1/1 |
| 5,832,477 | A | | 11/1998 | Bhargava | |
| 6,105,020 | A | | 8/2000 | Lindsay | |
| 6,275,818 | B1 | * | 8/2001 | Subramanian et al. | 707/2 |
| 6,295,527 | B1 | * | 9/2001 | McCormack et al. | 707/3 |
| 6,363,377 | B1 | * | 3/2002 | Kravets et al. | 707/4 |
| 6,411,951 | B1 | * | 6/2002 | Galindo-Legaria et al. | 707/3 |
| 6,618,729 | B1 | | 9/2003 | Bhashyam | |
| 6,640,226 | B1 | | 10/2003 | Shringeri | |
| 6,684,203 | B1 | * | 1/2004 | Waddington et al. | 707/3 |
| 6,721,749 | B1 | * | 4/2004 | Najm et al. | 1/1 |
| 6,789,071 | B1 | * | 9/2004 | Kapoor et al. | 707/2 |
| 7,283,999 | B1 | * | 10/2007 | Ramesh et al. | 1/1 |
| 7,392,248 | B2 | * | 6/2008 | Bakalash et al. | 1/1 |
| 7,428,536 | B2 | * | 9/2008 | McGuire et al. | 707/5 |
| 2004/0015470 | A1 | * | 1/2004 | Smith et al. | 707/1 |
| 2004/0220904 | A1 | * | 11/2004 | Finlay et al. | 707/3 |
| 2004/0220909 | A1 | * | 11/2004 | Brown et al. | 707/3 |
| 2004/0243571 | A1 | * | 12/2004 | Judd | 707/3 |
| 2005/0004918 | A1 | * | 1/2005 | Platt | 707/100 |
| 2005/0033741 | A1 | | 2/2005 | Dombroski | |
| 2005/0055384 | A1 | * | 3/2005 | Ganesh et al. | 707/202 |
| 2005/0097100 | A1 | * | 5/2005 | Galindo-Legaria et al. | 707/3 |
| 2005/0187907 | A1 | * | 8/2005 | Wortendyke et al. | 707/3 |
| 2005/0198065 | A1 | | 9/2005 | Eppley | |
| 2005/0228768 | A1 | * | 10/2005 | Thusoo et al. | 707/1 |
| 2006/0117036 | A1 | | 6/2006 | Cruanes | |
| 2006/0122990 | A1 | | 6/2006 | Smith | |
| 2006/0167865 | A1 | * | 7/2006 | Andrei | 707/4 |
| 2006/0218123 | A1 | * | 9/2006 | Chowdhuri et al. | 707/2 |

(Continued)

OTHER PUBLICATIONS

Kabra et al., OPT++: An Object-Oriented Implementation for Extensible Database Query Optimization, Apr. 1999, Springer-Verlag New York, Inc., vol. 8, Issue 1, pp. 55-78.*

(Continued)

*Primary Examiner* — Kuen Lu
*Assistant Examiner* — Jessica N Le

(57) ABSTRACT

Systems and methods that eliminate non-qualifying data for queries against data warehouses and improve execution time, via a dynamic filter component(s). In general, such dynamic filter components are derived from data during processing of the query and without being explicitly defined by the users within a query forwarded to the data warehouse. Moreover, an evaluation component can monitor efficiency of filter components (e.g., number of rows that can be eliminated), and dynamically change and/or update the evaluation order of such filters.

16 Claims, 11 Drawing Sheets

U.S. PATENT DOCUMENTS

2006/0282422 A1* 12/2006 Al-Omari ............ 707/4
2006/0282423 A1* 12/2006 Al-Omari et al. ........ 707/4
2007/0226204 A1* 9/2007 Feldman ............ 707/5
2007/0233648 A1* 10/2007 Zuzarte ............ 707/3

OTHER PUBLICATIONS

Galindo-Legaria et al., Outerjoin Simplification and Reordering for Query Optimization, Mar. 1997, ACM, vol. 22, Issue 1, pp. 43-74.*

Abello et al., On Relationships Offering New Drill-across Possibilities, Nov. 2002, ACM, pp. 7-13.*

Hanna Metzger. Ph-Down Hash Joins: The Star of the Show http://www-128.ibm.com/developerworks/db2/zones/informix/library/techarticle/0206metzger/0206metzger3.html. Last accessed Mar. 9, 2007. Jun. 19, 2002.

Shivnath Babu, et al. Adaptive Ordering of Pipelined Stream Filters http://delivery.acm.org/10.1145/1010000/1007615/p407-babu.pdf?key1=1007615&key2=4508143711&coll=GUIDE&dl=GUIDE&CFID=16455695&CFTOKEN=43308861. Last accessed Mar. 9, 2007. Sigmod, Paris, France. 2004, ACM.

Yihong Zhao, et al. Simultaneous Optimization and Evaluation of Multiple Dimensional Queries http://delivery.acm.org/10.1145/280000/276329/p271-zhao.pdf?key1=276329&key2=0728143711&coll=GUIDE&dl=GUIDE&CFID=16456020&CFTOKEN=56063615. Last accessed Mar. 9, 2007. Sigmod, Seattle, WA. 1998, ACM.

* cited by examiner

DYNAMIC FILTERS FOR RELATIONAL QUERY PROCESSING

BACKGROUND

Data warehouses typically store substantial quantities of information, and further strive to facilitate expeditious querying and efficient retrieval of such stored data. In general, a data warehouse is a nonvolatile repository that can store a substantial amount of data, such as historical and/or current information—wherein the historical data can correspond to past transactional or operational information. Accordingly, data warehousing and associated processing mechanisms (e.g., On-Line Analytical Processing (OLAP), Relational OLAP (ROLAP), Multidimensional OLAP (MOLAP), and Hybrid OLAP (HOLAP)) are widespread technologies employed to support business decisions and data analysis. Data warehouses are populated at regular intervals with data from one or more heterogeneous data sources, for example from multiple transactional or enterprise resource planning (ERP) systems. The aggregation of data can provide a consolidated view of an organization from which valuable information are derived.

Moreover, associated databases can organize and store data in a plurality of multidimensional tables, wherein the tables contain a series of rows (e.g., also referred to as records.) Each row provides particular information about a particular item such as a customer. Rows can further be divided into sections called columns. The intersection between a row and column is typically referred to as a field. Moreover, each field provides data or information related to a particular item. The columns specify the particular type of data provided in each field. For example, a table can be established for purchases of a particular product. Such table can include a plurality of rows corresponding to individual customers, and several columns for first name, last name, address, state, zip code, number of products purchased, price, date, and the like.

Database engines or management systems provide systems and mechanisms to retrieve and manipulate data from database tables upon specification of a query by a user. A query is typically expressed in a predetermined query language, such as Structured Query Language (SQL). In general, queries specify the data to be retrieved from a database. For example, a query can specify one or more tables as well as the rows to be retrieved, and any associated data operations or manipulations to be performed. Upon proper specification of a query, the database engine retrieves data and performs any specified operations, to produce a results table.

Typically, queries are processed in an operator tree, wherein data flows through such operator tree to calculate an answer for the query. Accordingly, queries against data warehouse and/or decision support systems commonly become complex, and hence require prolonged processing time for a vast amount of data. Moreover, the earlier that non-qualifying data are eliminated in such processes, the more efficient the complex queries can be executed.

In particular, many data warehouse applications are designed to follow a star or snowflake schema. In such schemas, a plurality of large fact tables (e.g., sales details) can be connected with multiple dimension tables (e.g., product information, sales region, and the like). Typical queries against such schemas consist of multiple joins of the fact table with several dimension tables. Moreover, the response time for these queries can become time consuming—e.g., measured in minutes or even hours, due to their intricate characteristics. Such prolonged execution time frames can diminish efficient utilization for the data warehouse applications, and result in an overall poor operation of the warehouse system.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that eliminate non qualifying data for queries against data warehouses and improve execution time, via a dynamic filter component(s) that analyzes incoming data to derive predicates therefrom (e.g., examining query contexts and assign value boundaries). Such dynamic filter component can be derived by the system itself, and without being explicitly defined by the users within a query forwarded to the data warehouse.

According to one aspect of the subject innovation, the dynamic filter component can be determined during execution of the query, and throughout a build phase of a hash join. Such dynamic filter component can be formed by analyzing incoming data filter predicates that are derived and applied at an early stage—(e.g., when reading data from a table referenced by the query). Hence, the subject innovation can mitigate a requirement of scanning the entire table referenced by the query (e.g., a fact table), and improve related execution times.

Moreover, the subject innovation identifies qualifying fact table rows before any of such rows are processed in the operator tree. When the fact table is accessed, the dynamic filter is applied and non-qualifying rows are immediately discarded, and thus qualifying rows can be processed in the operator tree. Hence, in general non-qualifying data need not be carried throughout an entire subtree and through the joins, and such early elimination of non-qualifying rows can reduce response times in an order of one or more magnitudes.

Moreover, when the system implements multiple dynamic filters on a fact table scan, an evaluation component can further improve execution by dynamically reordering evaluation of the filters. Accordingly, the evaluation component monitors efficiency of the dynamic filter components (e.g., number of rows that can be eliminated), and dynamically changes and/or updates the evaluation order thereof. Once a row fails to pass such a filter, it is discarded and hence the other filters need not evaluate such discarded row.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
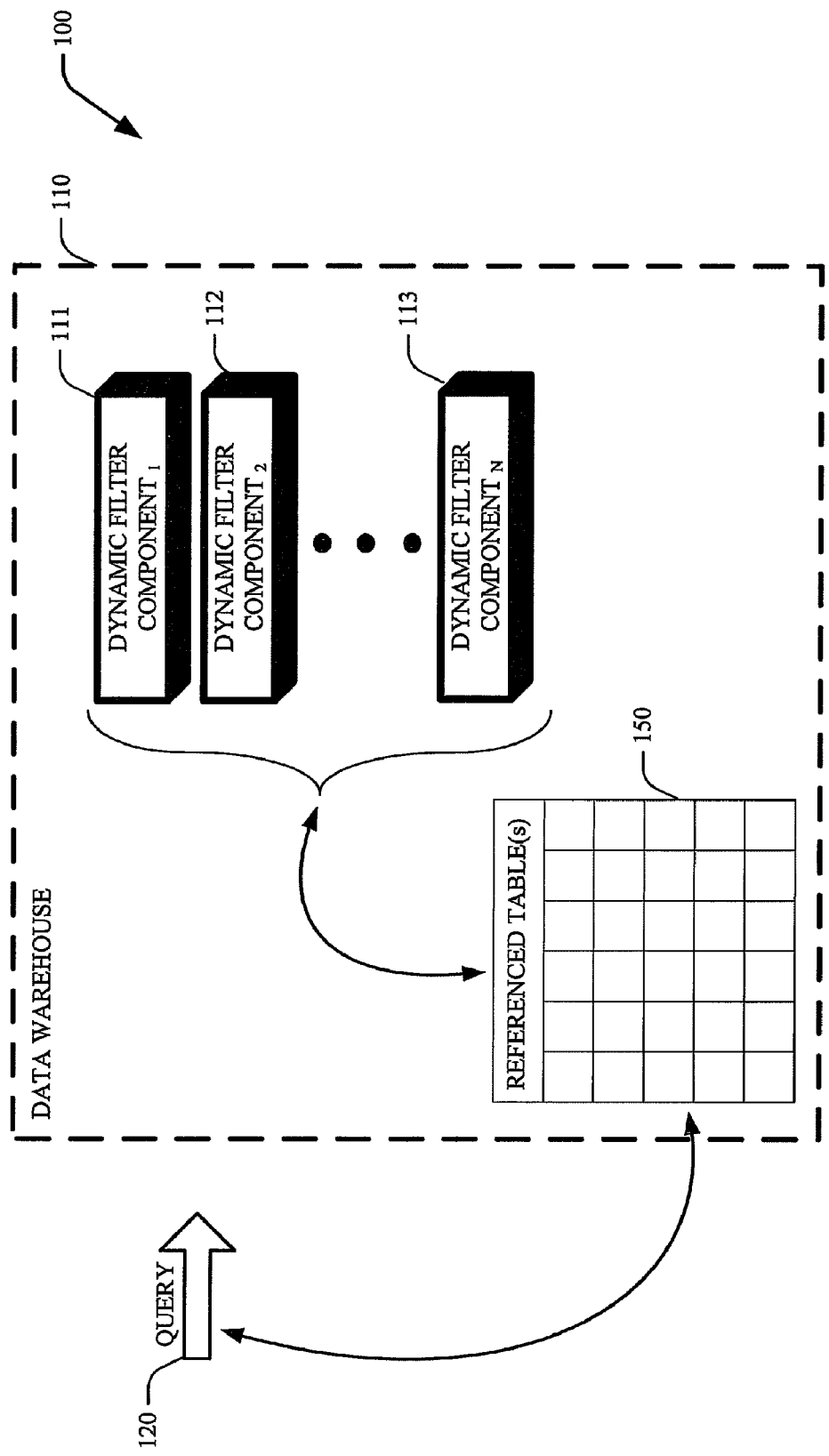
FIG. 1 illustrates a block diagram of a system with dynamic filter components, which eliminates non-qualifying data for queries against data warehouses.

FIG. 1 illustrates a block diagram of a system 100 with dynamic filter components, which eliminate non-qualifying data for queries against a data warehouse 110. The dynamic filter components 111, 112, 113 (1 thru N, N being an integer) are derived by the system 100 itself, and in general without being explicitly defined by the query 120 forwarded to the data warehouse 110. Such dynamic filter components 111, 112, 113 can operate on a surrogate key to enable filtering on the table 150 (which is referenced by the query 120). The system 100 itself can generate the dynamic filters 111, 112, 113 during execution of the query 120, and without user input. Moreover, the system 100 can determine locations on a query tree (not shown) associated with the query 120, for applying such dynamic filters.

In general, the query 120 implements a high level and declarative (non-procedural) language that typically needs to be translated into a procedural execution plan. The dynamic filter components 111, 112, 113 can reduce execution time for which such declarative request can be translated into procedural plans, and can further mitigate a requirement of scanning the entire table 150 (e.g., a fact table), which is referenced by the query 120.

The table 150 can be a fact table and by implementing the dynamic filter components 111, 112, 113, the non-qualifying data typically need not be carried throughout the joins of an associated query tree (e.g., through an entire subtree.) Such early elimination of non-qualifying rows can reduce response times in an order of one or more magnitudes. The dynamic filter components 111, 112, 113 can be formed via analyzing incoming data to derive predicates therefrom (e.g., examining query contexts and assign value boundaries), as described in detail infra.

Figure 2:
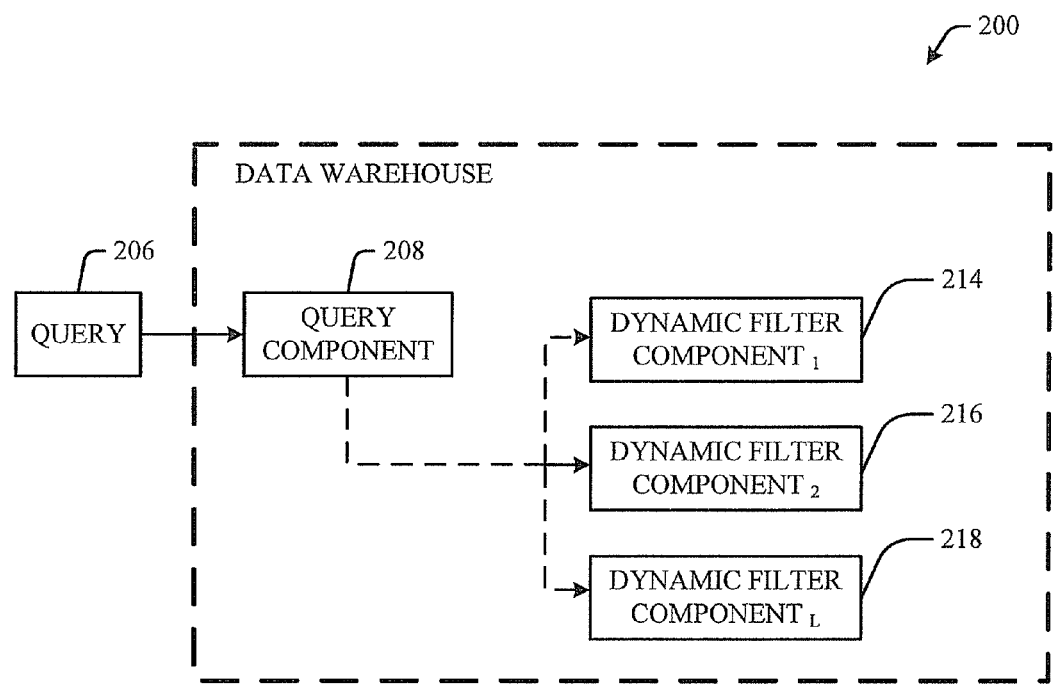
FIG. 2 illustrates a further block diagram for a system that employs dynamic filter components in accordance with an aspect of the subject innovation.

FIG. 2 illustrates a related system 200 according to one aspect of the subject innovation, wherein a query component 208 can extract query predicates from the query 206, to facilitate generating the dynamic filter component(s) 214, 216, 218 (where, L is an integer.) For example, a predicate can be an expression that asserts a fact about values. If such expression evaluates to TRUE, then the associated condition is satisfied. Otherwise, and if the expression evaluates to FALSE, then the condition is not satisfied. The dynamic filter component(s) 214, 216 and 218 can further analyze incoming data to derive additional predicates therefrom (e.g., examining query contexts and assign value boundaries). Such dynamic filter component(s) 214, 216, 218 can be derived by the system 200 itself, and without being explicitly defined by the users within a query forwarded to the data warehouse.

Figure 3:
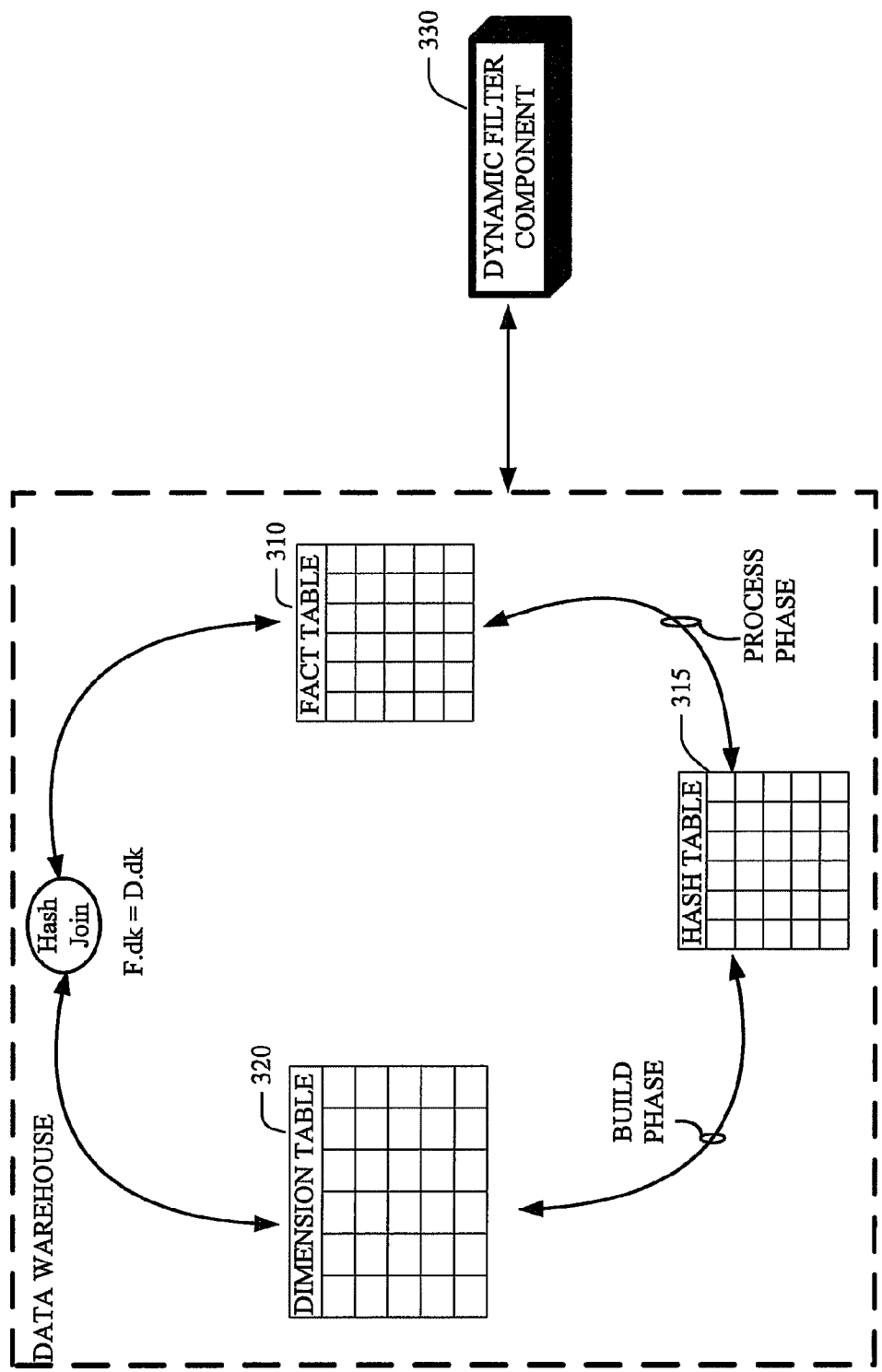
FIG. 3 illustrates a hash join execution that employs a dynamic filter component in form of a bit map filter in accordance with an aspect of the subject innovation.

FIG. 3 illustrates a join (e.g., a hash join) between a fact table 310 and a dimension table 320, and a processing thereof in accordance with an aspect of the subject innovation. In general, warehouse design methods require dimensions to include a surrogate key (not shown) to join the dimension table 310 with the fact table 320. The surrogate key can be a deliberately meaningless, single part, unique identifier, wherein no semantic value is associated with the key (e.g., its purpose is unique identification.) Moreover, such surrogate key can be automatically generated by an associated database system upon inserting or loading a row in a dimension table, for example. The dynamic filter 330 component can be automatically generated to operate on such surrogate key of the fact table 310, and enable filtering thereon. During building of the hash table 315, the incoming data can be examined to determine filter predicates that can form the dynamic filter component 330 for the surrogate key.

For example, data warehouse applications can be designed following a star and/or snowflake schema. In such a schema, one or more large fact tables (e.g., sales details) can be connected with multiple dimension tables (e.g., product information, sales regions, and the like). Typical queries against such a schema consist of multiple joins of the fact table with several dimension tables. Each join with a dimension table can further act as a filter that eliminates some rows from the fact table (e.g., the fact table storing information about individual sales transactions.) Moreover, a dimension table can save information about individual stores, wherein the query can request for sales of a set of specific stores, for example.

Absent the dynamic filters of the subject innovation, the system typically has to process all the fact table rows through some part of the operator tree before the join with the stores dimension table eliminates all transactions that did not originate from the specific stores of interest, for example. The subject innovation enables identifying qualifying fact table rows before any of such rows can be processed within an operator tree associated therewith. When the fact table is accessed, the dynamic filter component 330 can be applied to discard non-qualifying rows. Hence, in general only qualifying rows are processed in the operator tree. It is to be appreciated that the dynamic filters of the subject innovation are not restricted to hash joins. For example, the dynamic filters can be employed in the context of stop-and-go operators. In general, a stop-and-go operator requires processing all related input before results can be passed to the next operator. One particular example of a stop-and-go operator is a hash join build phase. Likewise, "sort" is another example, wherein a join algorithm that requires sorting of the inputs (merge join) can implement the dynamic filters of the subject innovation.

Figure 4:
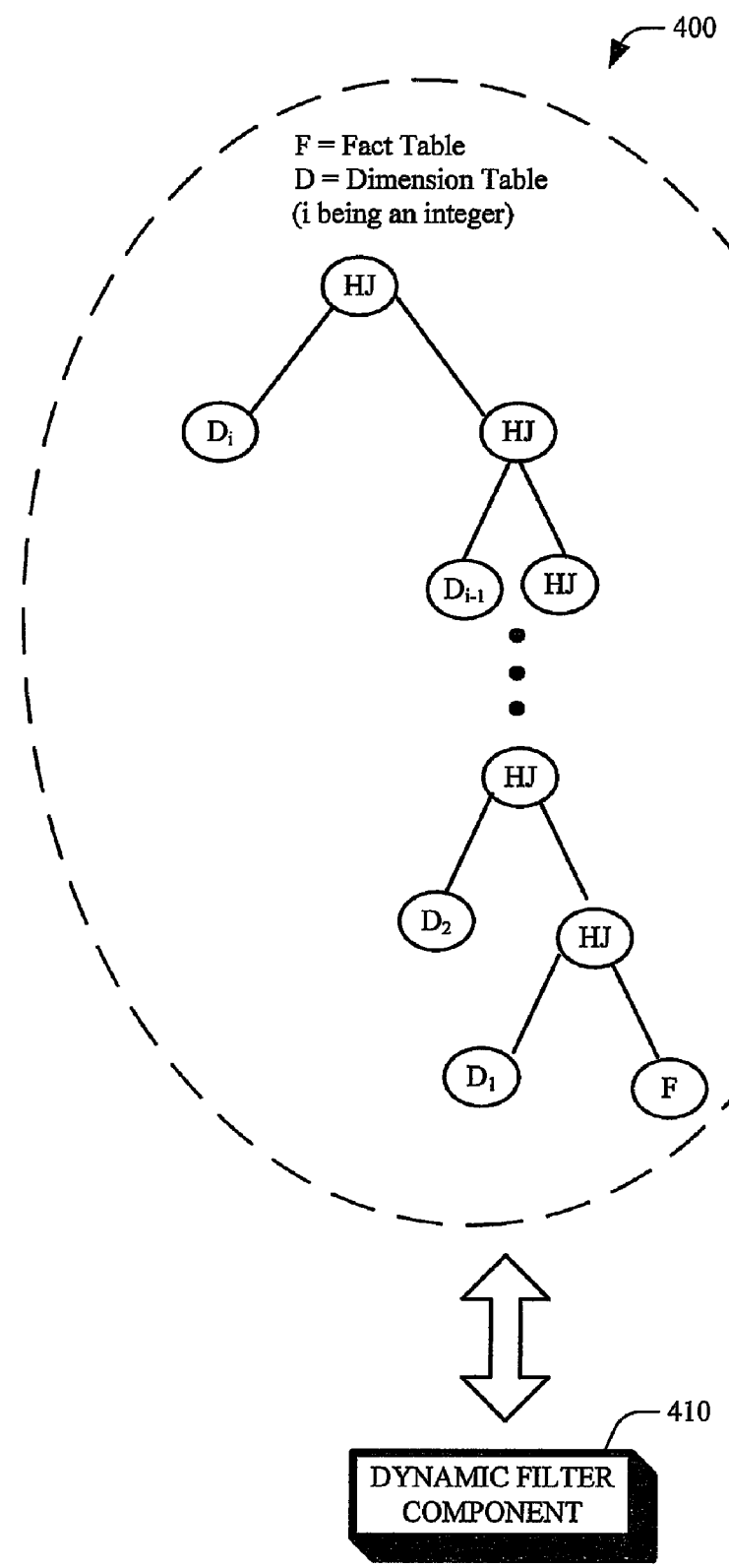
FIG. 4 illustrates a right deep tree of hash joins that interacts with a dynamic filter component(s) in accordance with an aspect of the subject innovation.

FIG. 4 illustrates a related aspect of the subject innovation, wherein the dynamic filter component 410 operates on the tree structure 400, to mitigate an overhead associated with processing and calculations of hash tables for a right deep hash join tree. For example, such overhead can occur when rows that are discarded by the last join in the plan have to be processed by all the other joins, (e.g., a row is processed through "n−1" number of joins, merely to be eliminated by the last join—where n is an integer.) Moreover, the right deep hash join tree 400 can result from building a hash table on a subsequent dimension table, wherein the result of an initial join can be employed to probe such subsequent dimension/table. Accordingly, the subject innovation can form the dynamic filter component 410 when a hash table is being created.

For example, the dynamic filters can be in form of bitmap filters. It is to be appreciated that the subject innovation is not so limited, and other filters types are well within the realm of the subject innovation. In general, a bitmap filter is a bitmap wherein a bit set to "1" can indicate that the associated join column value is present in the dimension table. Since the bitmap can be created before the fact table is processed, such filters can be employed to filter out rows early on—without being processed in subsequent joins. In a related aspect, before a row from the fact table is employed in any join, all the dynamic filters can be probed, for example. If the row fails one of the dynamic filter tests, (the appropriate bit in the bitmap filter is not set) it can be discarded. Accordingly, processing overhead can be reduced (e.g., since many rows can be discarded before they have to be processed in the joins.)

Figure 5:
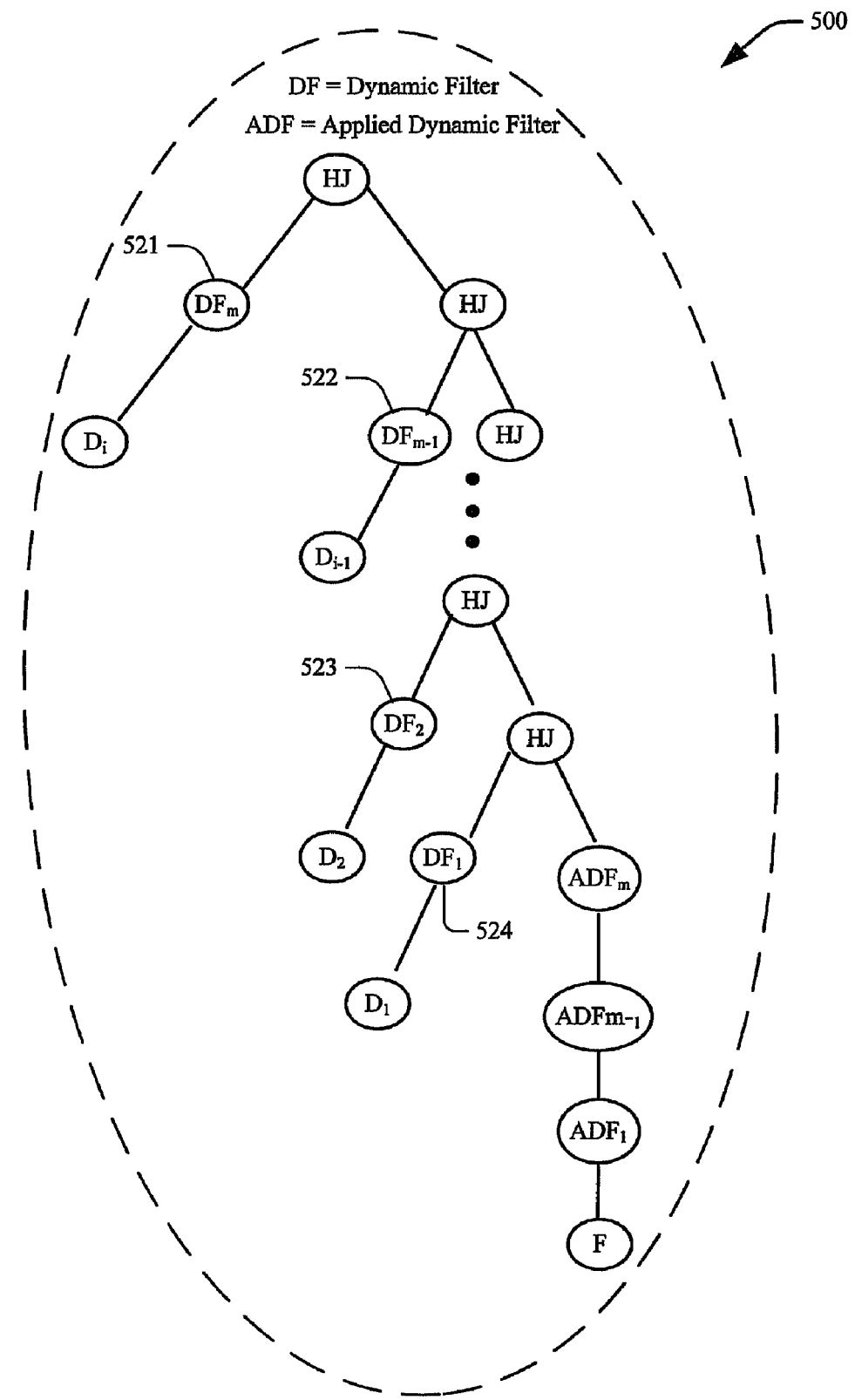
FIG. 5 illustrates a resulting right deep tree of hash joins with dynamic filters in accordance with an aspect of the subject innovation.

FIG. 5 illustrates a right deep tree of hash joins 500 with dynamic filters in accordance with an aspect of the subject innovation. During a build phase the dynamic filter components 521, 522, 523, 524 (where m is an integer) can be calculated. Processing rows from the fact table can commence after completion of the dynamic filter components 521, 522, 523, 524, and when all hash tables are complete. Accordingly, before the rows reach the first hash join, they can be passed through the newly introduced dynamic filters. Accordingly, the subject innovation enables creation of dynamic filter components on one part of the operator tree, and for a subsequent application thereof on another part of the operator tree.

In a related aspect, a star join pattern can be implemented as a right deep hash join tree with dynamic filter components, which are derived from the dimension tables. An implementation rule can be introduced that acquires a logical star join operator with one fact table and multiple dimension tables. Such logical star join operator can be implemented as a right deep tree of hash joins (with a dynamic filter creation operator for each dimension table), and a dynamic filter probe operator on the fact table (for each of the dynamic filter components.) It is to be appreciated that such plan is introduced as one alternative for executing the star join, and can be evaluated against other alternatives. Accordingly, if associated estimated costs are determined to be the lowest among all alternatives, then such plan can be executed.

In one particular example, assuming an n-way join (one fact table, and "n−1" dimension tables, where "n" is an integer), the implementation rule can introduce multiple plan alternatives, such as: a single hash join with dynamic filter between the fact table and one dimension table (all other joins can be implemented in alternative ways); or alternatively a right deep hash join plan with one fact table and two dimension tables and a dynamic filter for each dimension (the remaining joins can be implemented in other ways), for example. Moreover, in many data warehousing schemas the fact table contains a clustered index on one of the dimension tables. e.g., the fact table representing details of sales transactions can be clustered (sorted) by date and time.

Figure 6:
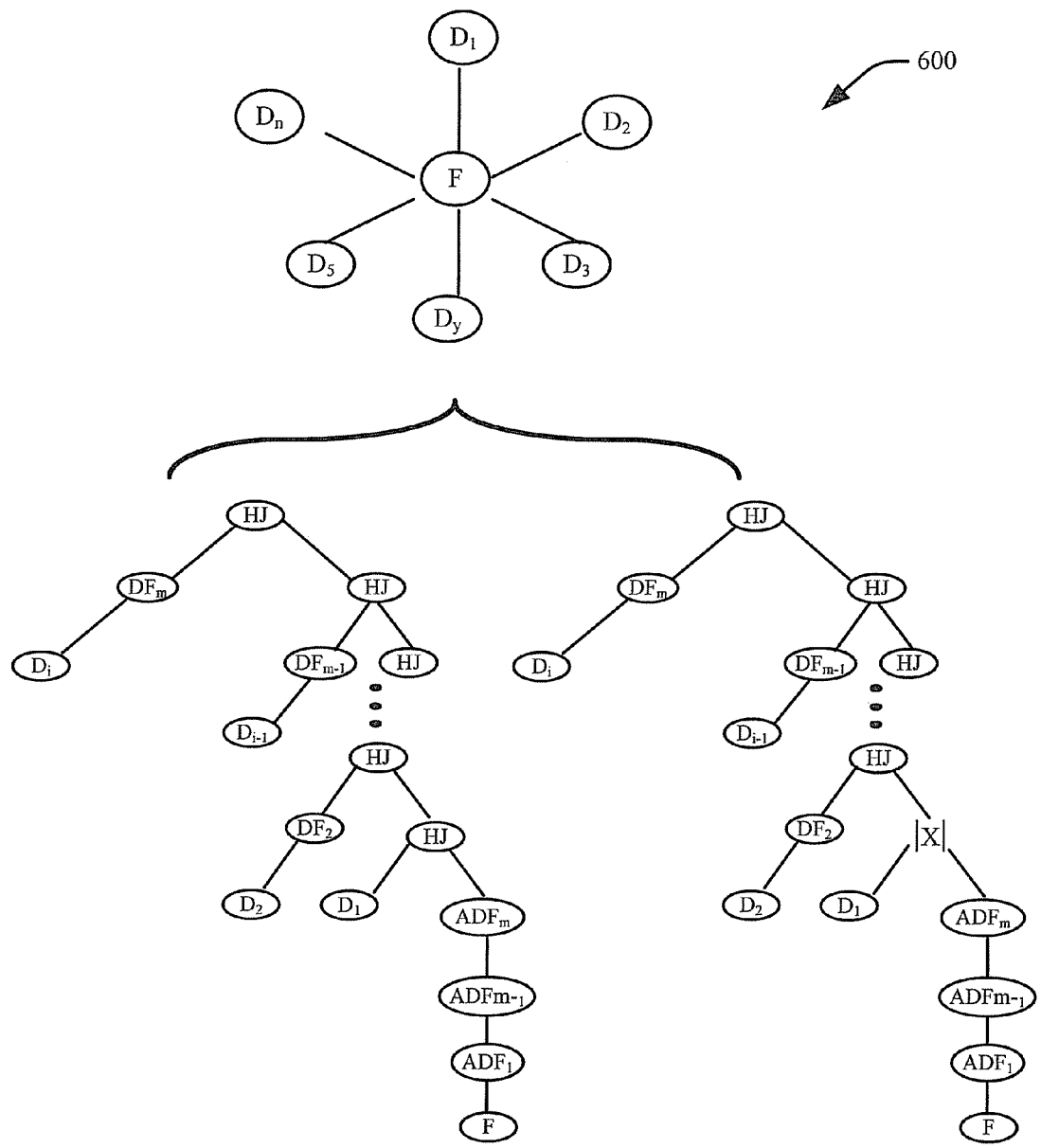
FIG. 6 illustrates an exemplary two-plan alternative that can be generated from a generic star join pattern.

For example, "date" can be one of the dimensions and many queries can further restrict the result to a certain date range. Accordingly, it is more efficient to read all qualifying rows from the date dimension, and in general request only qualifying rows from the fact table. Since the fact table is sorted on date, such can be readily performed (e.g., without processing all rows of the fact table.) Such a nested loop join is often more efficient than a hash join that has to process all fact table rows. Hence, an additional plan alternative can be created if the fact table is clustered on one of the dimensions used in the query—e.g., a join between the fact table and the clustering dimension followed by a right deep tree of hash joins in ascending selectivity order. An optimizer can then select the most efficient join algorithm for the first join. FIG. 6 illustrates an exemplary two-plan alternative 600 that can be generated from a generic star join pattern. As such, the subject innovation enables generating specific plan alternatives such as right deep hash join, right deep hash join with nested loop join on clustering dimension, for example.

Moreover, and as indicted earlier, one particular aspect of the subject innovation employs bitmap filters as an application of dynamic filter components. It is to be appreciated that other classes of dynamic filters are well within the realm of the subject innovation. For example, one can track the minimum and maximum of a qualifying dimension value. Furthermore, if the fact table is partitioned on this dimension, a filter predicate can be added to the fact table scan, such that rows in a particular range (a predetermined min, max range) qualify. Accordingly, entire partitions of the fact table can be eliminated from the query result.

In a related aspect, if a star jo in is implemented as right deep hash join tree with dynamic filter components, wherein such filters can then be evaluated for each row of the fact table, for example. Typically, a fact table row can be processed in hash joins only if it passes all dynamic filters. As such, as soon as a row fails a dynamic filter component it is discarded. As will be described in detail infra, the system can further monitor effectiveness (e.g., selectivity) of each dynamic filter component during execution, to dynamically reorder such filters and ensure that the most selective filters are considered at the beginning.

For each dynamic filter component, the system can count the total number of rows processed by such filter and the number of rows passing the filter test. After processing n rows (where n is an integer), the system calculates the selectivity of each dynamic filter as quotient of number of rows passing, divided by the number of rows being processed. Subsequently, the dynamic filters can be reordered by increasing quotient value, for example. Such can typically ensure that the most selective filters are evaluated first. Alternatively, if the system detects that a dynamic filter component is not effective (e.g., filter selectivity is substantially low), the system can disable such dynamic filter component altogether, as low selectivity filters incur unnecessary overhead and can be more efficient to not apply the filter and let the associated join eliminate non-qualifying rows.

Figure 7:
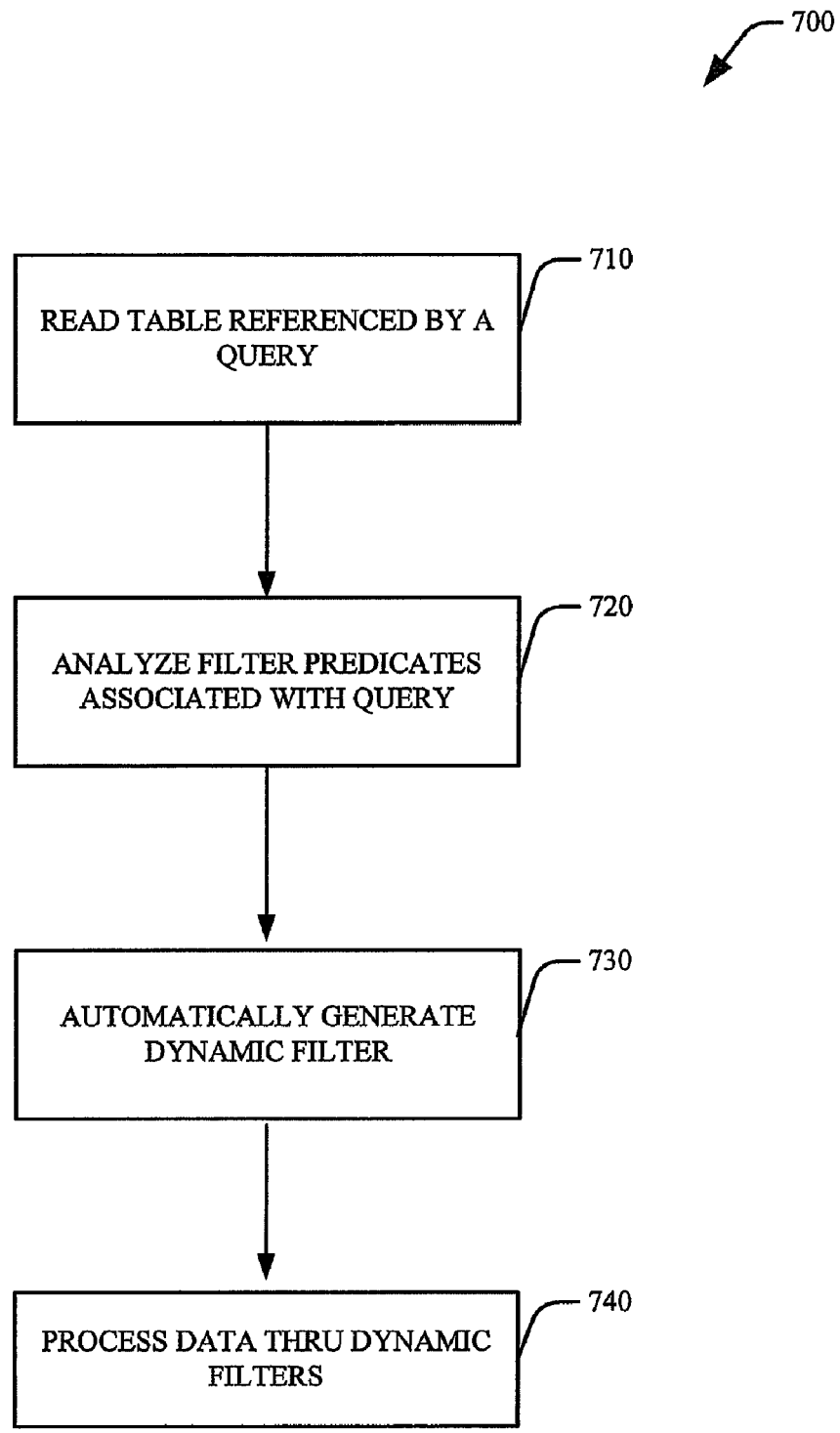
FIG. 7 illustrates a methodology of eliminating non-qualifying data for queries in accordance with an aspect of the subject innovation.

FIG. 7 illustrates a methodology 700 of eliminating non-qualifying data for queries in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 710 a table (e.g., a fact table) referenced by an incoming query (received by a warehouse) can be read. Next, and at 720 filter predicates—which are derived at an early stage—associated with such incoming query can further be analyzed to obtain dynamic filters, as described in detail supra. The system can automatically generate the dynamic filters at 730 without being explicitly defined by the users within a query forwarded to the data warehouse. Subsequently, and at 740 data (e.g., rows) can be processed by implementing the dynamic filter components of the subject innovation, wherein non-qualifying data need not be carried throughout an entire subtree and through the joins. Accordingly, such early elimination of non-qualifying rows can reduce response times in an order of one or more magnitudes.

Figure 8:
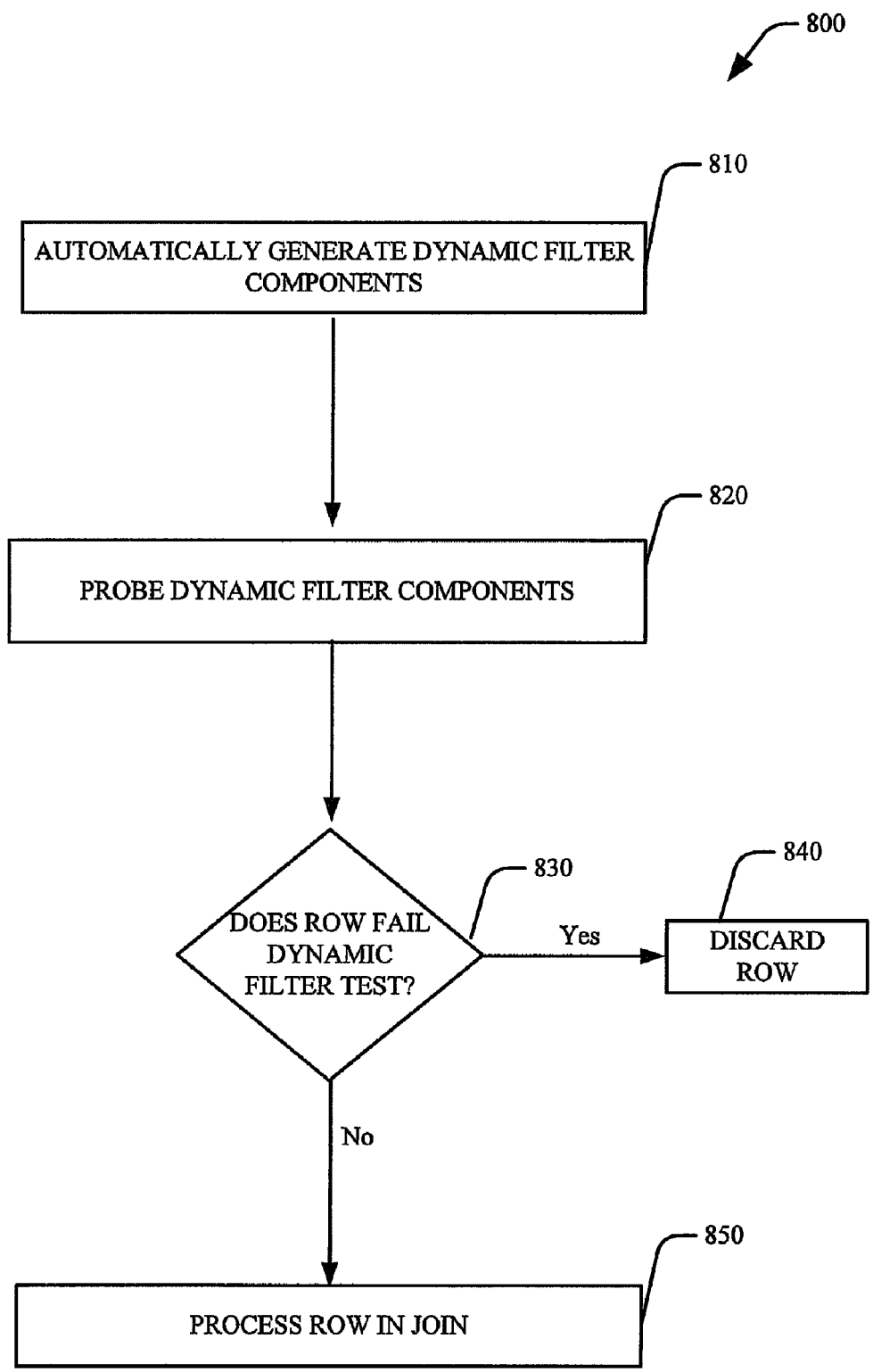
FIG. 8 illustrates a related methodology of processing rows in accordance with a particular aspect of the subject innovation.

FIG. 8 illustrates a related methodology 800 of processing rows in accordance with a particular aspect of the subject innovation. Initially and at 810 dynamic filter components can be automatically generated with respect to one segment of the operator tree, as described in detail supra, and can be applied to another segment thereof, for example. Next, and at 820 the dynamic filter components can be probed before a row of a table referenced by the query is employed in any join. At 830 a determination is made as to whether the row fails one of the dynamic filter tests (e.g., the appropriate bit in the bitmap filter is not set). If so, the row can be discarded at 840. Otherwise, the methodology proceeds to act 850, wherein such row is processed for the join. Accordingly, processing overhead can be reduced (e.g., since many rows can be discarded before they have to be processed in the joins.)

Figure 9:
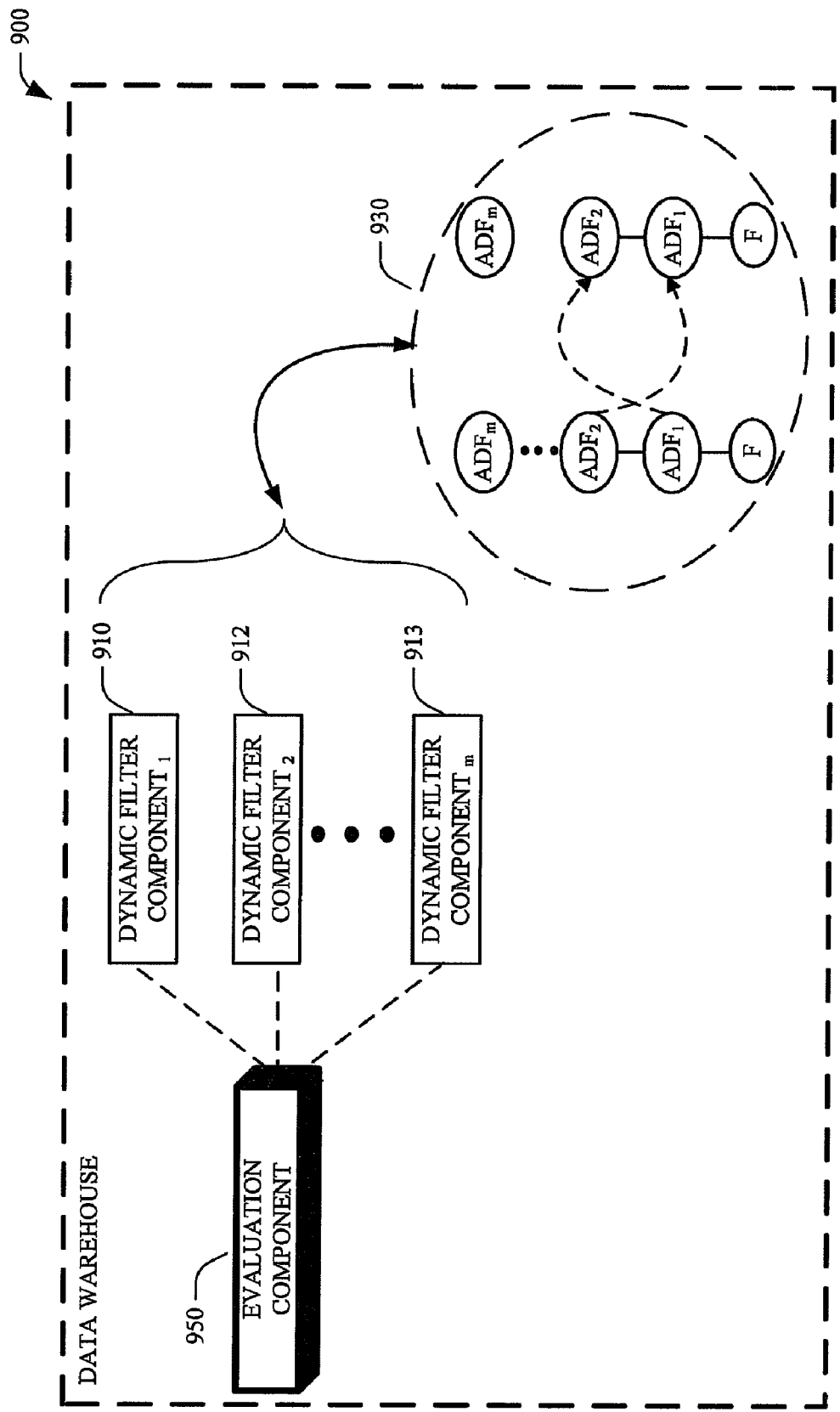
FIG. 9 illustrates a system that employs an evaluation component to re-order dynamic filters according to an aspect of the subject innovation.

FIG. 9 illustrates a system 900 that employs an evaluation component 950 in accordance with an aspect of the subject innovation. When the system 900 implements multiple dynamic filters 910, 912, 913, (1 to m, where m is an integer) on a scan for fact table 930, the evaluation component 950 can further improve execution by dynamically reordering evaluation of the dynamic filter components 910, 912, 913. Accordingly, the evaluation component 950 can monitor efficiency (e.g., number of rows that can be eliminated) of the dynamic filter components 910, 912, 913, and dynamically change and/or update the evaluation order of such filters. Once a row fails to pass a filter, it can be discarded and hence the other filters need not evaluate such discarded row. Such dynamic reordering of the dynamic filter components 910, 912, 913 can further improve execution times.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
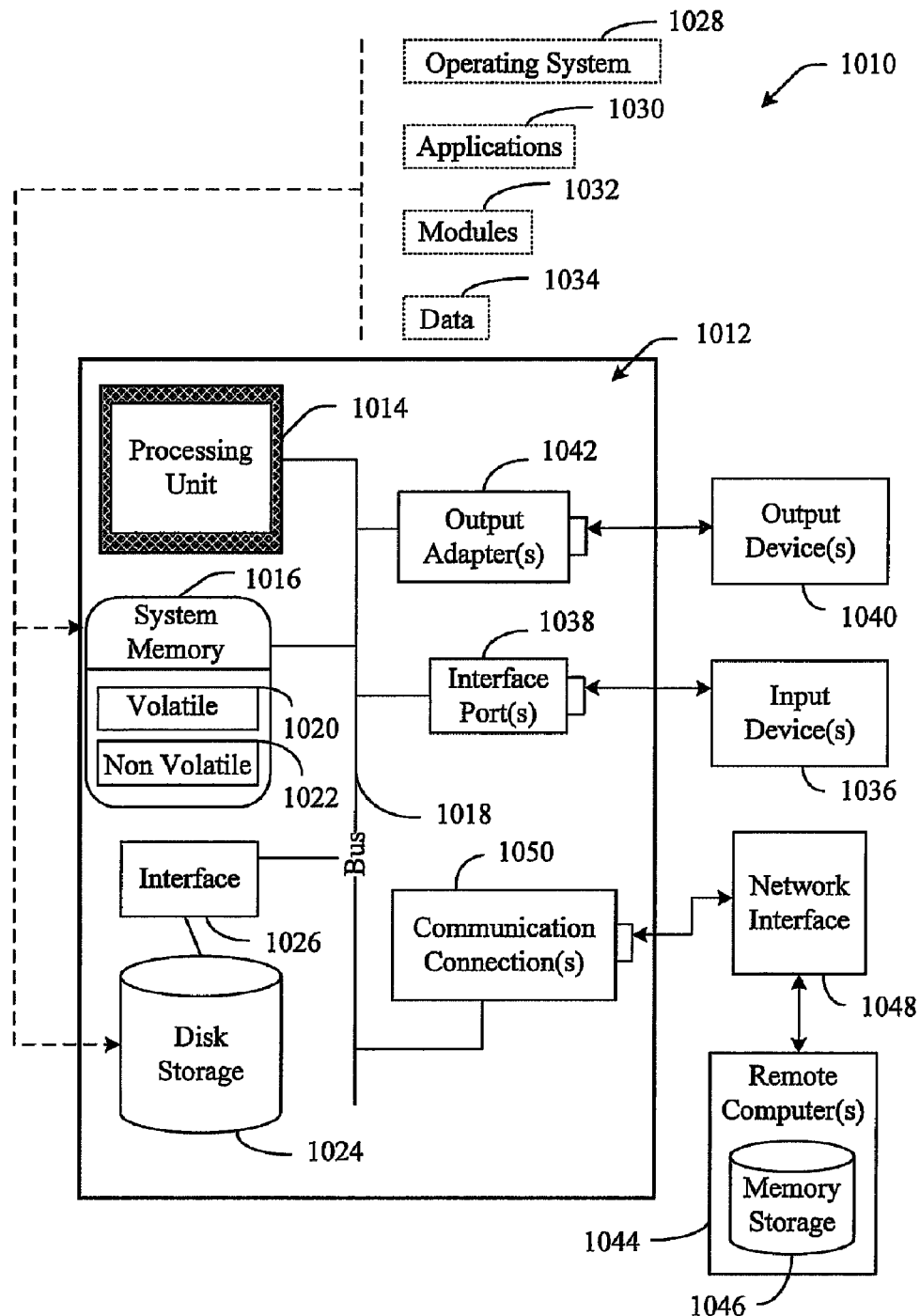
FIG. 10 illustrates a schematic block diagram of a suitable operating environment for implementing various aspects of the subject innovation.
Figure 11:
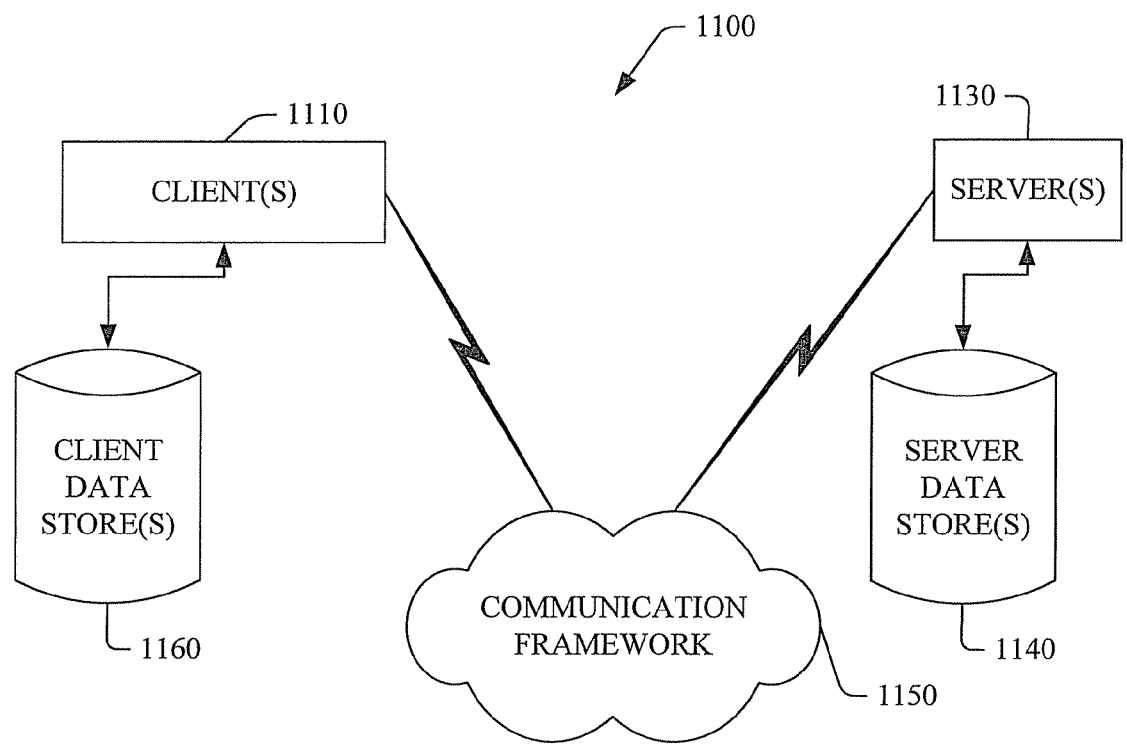
FIG. 11 illustrates a further schematic block diagram of a sample-computing environment for the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for analyzing aggregated tagging behavior of users. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising:
a processor; and
a memory component communicatively coupled to the processor, the memory component having stored therein computer-executable instructions configured to implement the system including:
an operator tree including at least one join configured to interact with a first table and a second table referenced by a query, wherein the operator tree is configured to receive first data from the first table via a first segment of the operator tree, and wherein the operator tree is configured to receive second data from the second table via a second segment of the operator tree;
a dynamic filter component configured to:
automatically generate a plurality of dynamic filters independent of an explicit external input, wherein the dynamic filter component is configured to generate the plurality of dynamic filters during execution of the query while the first data from the first table is received via the first segment of the operator tree, and wherein the dynamic filter component is configured to derive the plurality of dynamic filters via predicates that are formed through an analysis of the query; and
apply the plurality of dynamic filters at an initial position of the second segment of the operator tree according to an order based on a corresponding selectivity of each dynamic filter to eliminate a set of non-qualifying data from the second data prior to performing the at least one join, and wherein the dynamic filter component is configured to calculate the corresponding selectivity by dividing a number of rows passing through a corresponding dynamic filter by a number of rows being processed; and
an evaluation component configured to evaluate a performance order of the dynamic filter component, wherein the evaluation component is further configured to reorder the plurality of dynamic filters according to a corresponding quotient value, and wherein the corresponding quotient value is the number of rows passing through the corresponding dynamic filter divided by the number of rows being processed.

2. The computer implemented system of claim 1, wherein the second table being a fact table and the first table being a dimension table.

3. The computer implemented system of claim 2, wherein the fact table includes rows that are disposable by the dynamic filter component.

4. The computer implemented system of claim 2, wherein the join is associated with a star join pattern, and the dynamic filter component is configured to derive the plurality of dynamic filters from the dimension table.

5. The computer implemented system of claim 2, wherein the join is associated with a snow flake schema.

6. The computer implemented system of claim 2, wherein the dynamic filter component is configured to generate a surrogate key as a function of the first table, and wherein the dynamic filter component is configured to apply the surrogate key to the second table.

7. The computer implemented system of claim 2, further comprising an optimizer configured to select a join algorithm for the join.

8. A computer implemented method comprising the following computer executable steps:
employing a processor to execute computer executable instructions stored on a computer readable storage medium to implement the following steps:
determining predicates by examining a query, the query executed according to an operator tree including at least one join configured to interact with a first table having a first set of data and a second table having a second set of data, wherein the operator tree is configured to receive the first set of data via a first segment of the operator tree, and wherein the operator tree is configured to receive the second set of data via a second segment of the operator tree;
automatically generating a plurality of dynamic filters from the predicates independent of an explicit external input, wherein the plurality of dynamic filters are generated during execution of the query while the first set of data is received via the first segment of the operator tree;
applying the plurality of dynamic filters at an initial position on the second segment of the operator tree according to an order based on a corresponding selectivity of each dynamic filter, wherein the dynamic filter facilitates eliminating a set of non-qualifying data from the second set of data prior to performing the at least one join, and wherein the corresponding selectivity is calculated by dividing a number of rows passing through a corresponding dynamic filter by a number of rows being processed; and
evaluating a performance of the order, wherein the plurality of dynamic filters are reordered according to a corresponding quotient value, and wherein the corresponding quotient value is the number of rows passing through the corresponding dynamic filter divided by the number of rows being processed.

9. The computer implemented method of claim 8, further comprising eliminating the set of non-qualifying data from a fact table referenced by the query, wherein the second table is the fact table.

10. The computer implemented method of claim 8, the determining step further comprising assigning value boundaries.

11. The computer implemented method of claim 9, further comprising identifying a set of qualifying rows from the fact table referenced by the query.

12. The computer implemented method of claim 11, further comprising processing the set of qualifying rows.

13. The computer implemented method of claim 8, further comprising generating the plurality of dynamic filters during a build phase of a hash join corresponding to the first table and the second table.

14. The computer implemented method of claim 13, further comprising probing the second table with the dynamic filter before a row of the second table is employed in the hash join.

15. The computer implemented method of claim 8, further comprising ascertaining a number of eliminated rows.

16. A non-transitory computer readable storage medium comprising:

a memory component configured to store computer-readable instructions, the computer-readable instructions including instructions for performing the following acts:

processing an operator tree including a plurality of joins associated with a first table and a second table referenced by a query, wherein the operator tree is configured to receive first data from the first table via a first segment of the operator tree, and wherein the operator tree is configured to receive second data from the second table via a second segment of the operator tree;

generating a plurality of filters independent of an explicit external input, wherein the plurality of filters are generated during execution of the query while the first data from the first table is received via the first segment of the operator tree, and wherein the plurality of dynamic filters are derived via predicates that are formed through an analysis of the query;

eliminating a set of non qualifying data from the second table before performing any of the plurality of joins, the non qualifying data eliminated by applying the plurality of filters at an initial position on the second segment of the operator tree according to an order based on a corresponding selectivity of each filter to eliminate the set of non qualifying data as the second data from the second table is initially received via the second segment of the operator tree, wherein the corresponding selectivity is calculated by dividing a number of rows passing through a corresponding dynamic filter by a number of rows being processed; and evaluating a performance of the order, wherein the plurality of dynamic filters are reordered according to a corresponding quotient value, and wherein the corresponding quotient value is the number of rows passing through the corresponding dynamic filter divided by the number of rows being processed.

* * * * *